Sept. 10, 1946.    J. A. JONES    2,407,427
SELF-LOCKING WEDGE
Filed Oct. 11, 1943
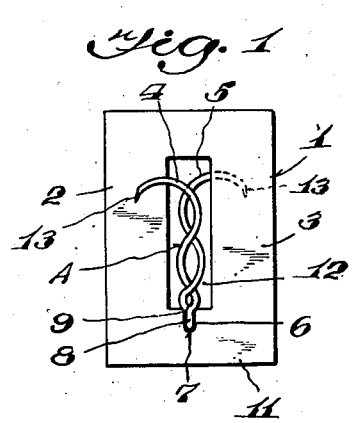
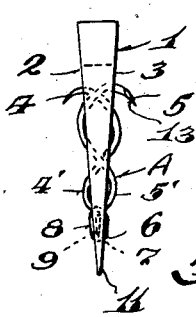
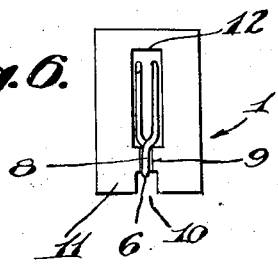
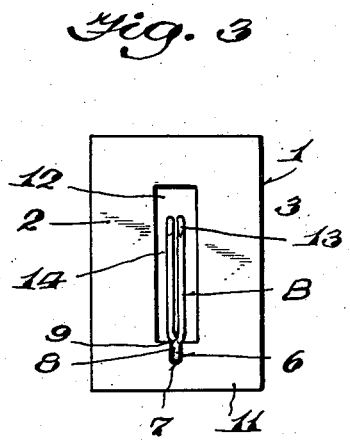
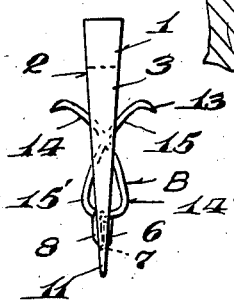
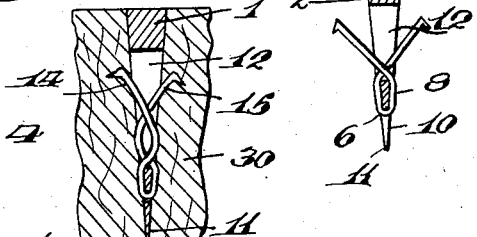
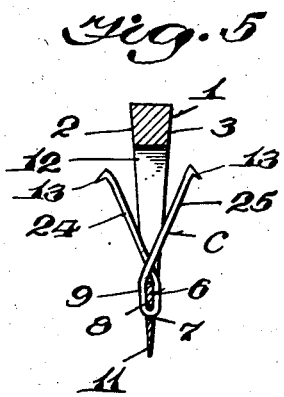
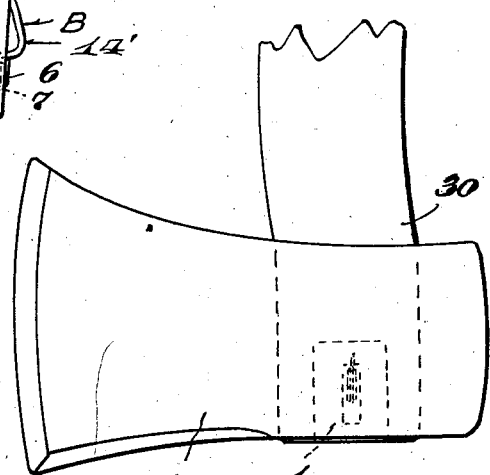
Inventor
James A. Jones,
By Milburn & Milburn
Attorneys Patented Sept. 10, 1946

2,407,427

UNITED STATES PATENT OFFICE 2,407,427

SELF-LOCKING WEDGE

James A. Jones, Fayetteville, Ark.

Application October 11, 1943, Serial No. 505,834

6 Claims. (Cl. 306—33)

The invention is designed primarily for use as a means of insuring the secure attachment of a tool, for example a hatchet, hammer or axe, upon its handle, but is capable of use with beneficial results in many other relations where a tight and secure joint between a handle, rod, shank or like member of wood or other suitable material and its head, socket or cooperating coupling may be necessary or desirable.

One of the principal objects of the invention is the provision of an improved locking device for use in the connection of a handle, rod, shank or like member and its head or socket which may be easily and inexpensively manufactured but which will be effective and durable in producing and maintaining a tight and secure connection.

Another important object of the invention is the provision of a locking device which may be sold as a unit, completely assembled with its locking means and ready for use, the insertion of the device into position placing the locking means into active locking relation and thus rendering it unnecessary to insert an additional locking element after the insertion of the locking device.

Another object of the invention is the provision of a self-locking wedge which may be handled and applied in the same manner and with the same facility as the ordinary wedge heretofore used in endeavoring to tighten and render secure various joints, such, for example, as the connections between axes, hatchets, hammers and the like and their handles, and which, when applied, will produce a tighter and more secure and lasting joint or connection.

A further object is the provision of a wedge for tool handles or the like which is self-locking and will not work loose or become ineffective through repeated and long-continued use of the tool or other article which it is designed to hold secure.

Other objects and advantages of the improved device which constitutes my invention will be apparent from the accompanying specification and drawing, wherein:

Figure 1 is a side elevational view of the preferred form of my improved locking device;

Figure 2 is an edge elevational view of the device illustrated in Fig. 1;

Figures 3 and 4 are views similar to those of Figs. 1 and 2, respectively, of a modified form of my locking device;

Figure 5 is a central vertical sectional view, generally similar to the edge elevational views of Figs. 2 and 4, of another modified form of embodiment of my invention;

Figures 6 and 7 are views similar to the views of Figs. 1 and 5, respectively, showing a modified form of attachment of the locking member to the wedge;

Figure 8 is a vertical side elevational view (partly broken away) of a tool with my locking device applied thereto, the locking device being indicated in dotted lines; and Figure 9 is a fragmentary central vertical sectional view through the locking device in Fig. 8, taken on a plane at right angles to the plane of Fig. 8 and showing the locking device in its locking position.

Essentially my invention comprises a locking device, preferably in the form of a wedge 1 of usual tapered configuration end to end, with substantially flat side faces 2, 3, associated with a locking member comprising arms 4, 5 (Figs. 1 and 2), 14, 15 (Figs. 3 and 4) or 24, 25 (Fig. 5) secured to wedge 1 and normally projecting outwardly therefrom on its opposite sides. The wedge 1 may be made of malleable iron or other suitable material, while the locking arms 4, 5 or arms 14, 15, or 24, 25, may be of wire possessing sufficient strength and resiliency to have a tendency to stand outwardly from the wedge and bite into the wood or other material in which they are designed to exert a locking action. Arms 4, 5 (or arms 14, 15, or 24, 25) may be formed integrally as a unitary locking member, or as separate arms welded or otherwise securely anchored to wedge 1; the integral form of construction is preferred, because it is easier to manufacture and assemble and is less liable to become detached after having been placed in position on wedge 1.

Each form of my invention illustrated in the drawing includes such integral form of locking member, respectively designated A in Figs. 1 and 2, B in Figs. 3 and 4 and C in Fig. 5. Each locking member comprises a pair of arms 4, 5 (or 14, 15, or 24, 25) connected by an intermediate neck 6 engaging wedge 1 in such manner that the arms, at their free end portions, project outwardly from wedge 1 and beyond the side faces thereof. As a convenient and effective manner of securing the arms 4, 5, (or 14, 15, or 24, 25) to wedge 1, the locking member A (or locking member B or C) may be passed through an aperture 7 provided in wedge 1 for this purpose and may be firmly anchored in the walls of aperture 7 by bending locking member A (or locking member B or C) to form an anchoring loop 8 seated in grooves 9 in the side walls of wedge 1, with its neck 6 in aperture 7. Although not essential, welding of loop 8 or neck 6, or both, in position may be employed for further security, if desired.

As an alternative manner of anchoring locking member A (or locking member B or C) to wedge 1, neck 6 may be engaged in a notch 10 in the pointed or thinner end 11 of wedge 1 and loop 8 seated in recesses or grooves 9 in its side walls, as shown in Figs. 6 and 7.

The arms 4 and 5, 14 and 15, and 24 and 25, of locking members A, B and C, respectively, when attached to wedge 1 in either of the ways described above, are bent, from the free ends of loop 8, inwardly into slot 12 and projected through slot 12 into locking position. The parts of each loop 8 which extend along the side faces of wedge 1 seat in the grooves 9 to prevent their projection beyond the surface of either of such side faces.

In locking member C, the simplest form of my device (shown in Fig. 5), the arms 24, 25, bend only to form loop 8 and project directly from loop 8 through slot 12 and outwardly from slot 12 to active locking position, arms 24, 25, crossing each other within slot 12 and, with their loop as a base, forming a pair of resiliently-mounted spring arms.

In locking member B, the form of embodiment shown in Figs. 3 and 4, arms 14, 15, bend through slot 12 and, by a reverse bend 14', 15', form a spring seat of greater strength and resiliency for the active portion of each of the arms 14, 15, which project outwardly from slot 12 in substantially straight locking portions which stand substantially at right angles to the planes of the wider faces of wedge 1 on opposite sides thereof and substantially in alignment with slot 12.

In locking member A, the preferred form of my invention (shown in Figs. 1 and 2), the construction is generally similar to locking members B and C, its neck 6 being anchored in aperture 7, its loop 8 being seated in grooves 9 and its arms 4 and 5 being bent inwardly in crossed relation through slot 12 and reversely bent, at 4' and 5', respectively, and extending, from bends 4', 5' through and outwardly of slot 12 toward the thicker end of wedge 1. In locking member A, however, the free ends of the arms 4, 5, instead of projecting from the reverse bends 4', 5', substantially straight through slot 12 and beyond the respective outer faces of wedge 1 substantially at right angles to the wedge faces, as in locking members B and C, are formed with a twist or spiral curve in each arm, so that the effective ends of the locking arms 4, 5, are positioned on opposite sides of the axial line of slot 12, the remaining portions of arms 4, 5, standing substantially in alignment with slot 12.

This configuration of arms 4, 5, gives the spring locking member A spiral stress and the arms 4, 5, greater penetrating action when wedge 1 is driven into position, for example into handle 30 of tool 31, making the ends 13 of arms 4, 5, bite more deeply into the wood of handle 30. The twisting effect of the spiral and the bending strain at the reverse bends 4', 5', continue to exert themselves when the wedge 1 is seated, thus increasing the locking action of wedge 1 and the difficulty of its withdrawal.

In order to increase their biting action the active ends 13 of arms 4, 5 (or of arms 14, 15, or 24, 25) of locking members A, B or C, respectively, may be pointed or sharpened.

It is to be understood that the wire of which locking members A, B and C are formed may be flat or of any other suitable cross-sectional shape or configuration, my invention not being limited to the use of round wire. It should also be understood that the wedge 1 may be made in different sizes and that the locking member A, B or C is capable of variation in size relative to the size of wedge 1. It should also be noted that the notch 10, shown in Fig. 6, is enlarged for the sake of clarity and need only be of sufficient width to permit the entry of neck 6.

I claim:

1. A device of the character described comprising a wedge having a slot therein and a plurality of locking arms each secured at one end to said wedge in its relatively thin portion and projecting through said slot and beyond the opposite faces of said wedge in the direction of the thicker end of said wedge.

2. A device of the character described comprising a wedge having a slot therein and locking arms each secured at one end to said wedge in its relatively thin portion, said arms extending in crossed relationship through said slot with their free ends projecting beyond the opposite faces of said wedge in the direction of the thicker end of said wedge and substantially in alignment with said slot.

3. A device of the character described comprising a wedge having a slot and an opening therein, said opening being adjacent the thinner edge of said wedge, and an integral locking member comprising a pair of locking arms connected by a neck portion and a loop portion, said neck portion being seated in said opening and said loop portion embracing a portion of said wedge between said opening and said slot, said arms extending through said slot with their free ends projecting beyond the opposite faces of said wedge.

4. A device of the character described comprising a wedge having flat inclined faces and tapered side edges, a slot through said faces substantially on its medial longitudinal line and a notch in the thinner tapered edge substantially in longitudinal alignment with said slot, and an integral locking member comprising a pair of locking arms connected by a neck portion and a loop portion, said neck portion being seated in said notch and said loop portion embracing said wedge between said notch and said slot, said arms extending through said slot with their free ends projecting beyond the opposite flat inclined faces of said wedge.

5. A device of the character described comprising a metal wedge having a slot therein and an integral resilient wire locking member comprising a pair of locking arms secured to said wedge at its relatively thinner portion with their free ends extending through and projecting beyond said slot in the direction of the thicker end of said wedge, the terminal portions of said free ends being sharpened.

6. A device of the character described comprising a wedge having a slot therethrough and a notch in its thinner tapered edge, and locking arms each secured at one end to said wedge in said notch, said arms extending through said slot with their free ends projecting beyond the opposite faces of said wedge toward its head portion.

JAMES A. JONES.